J. F. LAMB.
ELECTRICALLY HEATED UTENSIL.
APPLICATION FILED FEB. 1, 1912.
1,060,263.
Patented Apr. 29, 1913.
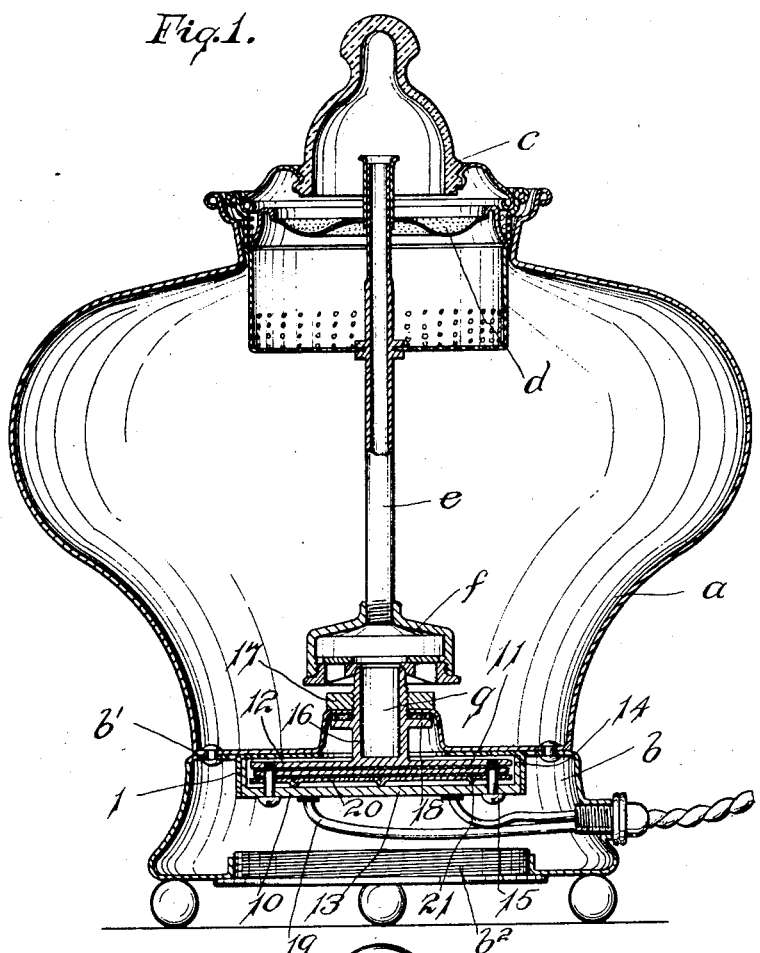
INVENTOR
Joseph F. Lamb

UNITED STATES PATENT OFFICE.

JOSEPH F. LAMB, OF NEW BRITAIN, CONNECTICUT, ASSIGNOR TO LANDERS, FRARY & CLARK, OF NEW BRITAIN, CONNECTICUT, A CORPORATION OF CONNECTICUT.

ELECTRICALLY-HEATED UTENSIL.

1,060,263.

Specification of Letters Patent. Patented Apr. 29, 1913.

Application filed February 1, 1912. Serial No. 674,744.

*To all whom it may concern:*

Be it known that I, JOSEPH F. LAMB, a citizen of the United States, and a resident of New Britain, county of Hartford, State of Connecticut, have invented a certain new and useful Improvement in Electrically-Heated Utensils, of which the following is a specification.

One feature of the invention, applicable for use with any type of an electrically heated utensil relates to the protection of the heater in order to prevent the dissipation and loss of heat.

Another feature of general applicability relates to the manner of assembling the heater with the utensil.

Other features of the invention relate to the electrical heating or operation of devices known as percolators.

For purposes of illustration and description, I have selected a percolator, inasmuch as all features of the invention can be readily seen and understood as embodied therein.

Figure 1 shows a percolator made in accordance with my invention, in central vertical section. Fig. 2 illustrates another type of utensil made in accordance with my invention.

I will first describe the structure illustrated, and then point out the various features of my invention which are present in the structure. $a$ denotes the bowl of the percolator, $b$ the base, $c$ the cover, $d$ the tray in which is held the material from which the infusion is to be made, $e$ the fountain tube adapted to deliver the water above the tray so that it will drip down onto and through the material in the tray back into the bowl, $f$ the valve at the lower end of the fountain tube to control the passage of the water from the bowl into the vaporizing chamber $g$ where it is vaporized to create a pumping effect to cause it to pass up to the fountain tube.

There are various forms of valves and vaporizing chambers, and my invention is not limited to its use with the type here illustrated.

The structure here described is such a one as I prefer but it is obvious that in many respects and especially in the character and construction of the radiating members it is susceptible of modification and alteration.

1 denotes a chamber provided at the bottom of the percolator bowl. 10 denotes the heater adapted to fit closely within this chamber. It is of usual construction in its essential parts, that is to say, it comprises a resistance such as the coil 11 and the oppositely arranged radiating plates 12, 13. It differs in that one of the radiating members as 13 has an upstanding flange 14 of a shape corresponding to the shape of the chamber so that the entire surface of the flange can be brought into close contact with the wall of the chamber in order that the heat in the member 13 will be transmitted to the bowl of the percolator. As thus constructed, the lower radiating member is cup-shaped and receives the resistance coil and the upper radiating member, the structure being held together as by the screws 15.

By preference I make the vaporizing chamber as a part of, and preferably an integral part of, the other radiating member 12, by providing a recessed hub 16 which projects into the interior of the percolator bowl and is exteriorly threaded to receive the nut 17 by means of which the heater is held in place. The valve fits down on the top of this hub as illustrated. The hub is provided with an exterior lateral flange 18 to take a bearing on a wall of the chamber. Inasmuch as it is desirable to concentrate all of the heat of the radiating plate 12 at the vaporizing chamber, this plate is spaced from the wall of the chamber and is thus effectually insulated by the dead air space surrounding it, the entire heating effect being centered at the vaporizing chamber. An asbestos washer is placed between the lateral flange 18 and the wall of the chamber to prevent radiation of heat to the bowl at this point.

The base $b$, having the inturned flange $b'$ by means of which it is secured to the percolator bowl and the screw cap $b^2$ closing it at the bottom, forms in connection with the wall of the bowl a dead air space underneath the heater. It is apparent that all that part of the radiating member 13 except the upstanding side flange is exposed, but the dead air space prevents the dissipation or loss of heat. The chamber which holds the heater may be made and formed in various ways, but preferably I form it separate from the bowl and of inverted cup shape the side walls of which contact with the upstanding flange 14, the end wall being drawn into close contact with the wall of the bowl in order that the heat transmitted from the radiating member 13 to the chamber will by it be transmitted to the bowl and so to the contents thereof. The terminals 19 from the resistance 11 are brought down to the base and connected up with a receptacle adapted to receive any suitable connection plug.

That part of the invention providing against the loss of heat from the heater is not concerned with the shape of construction of the heater, or to the manner of its assemblage with the utensil, but relates solely to the provision of a heat insulator about exposed parts of the heater, which insulator as shown, and by preference, takes the form of dead air spaces as illustrated and described.

That part of the invention relating to the manner of assembling the unit with the utensil is concerned solely with the provision of a suitable chamber in order that the heating effect can be obtained from both of the radiating members of the heater, together with means for insulating exposed parts of the radiating members when so embodied. There are various ways in which these chambers can be made, either as an integral part of the bowl or separate therefrom but secured in close contact therewith. The principal consideration is that there shall be some mechanical way of attaching the element to the utensil and for holding the chamber in close contact with the wall of the utensil in order to provide for the most perfect transmission of the heat. This avoids liability of damage to the utensil due to over heating, such as would be occasioned if the parts were soldered together.

That part of the invention relating to the use of a heating element in a specific device, such as a percolator, resides in concentrating all of the heat of one of the radiating members at the vaporizing chamber which is formed as a part thereof, all of the heat of this member being utilized for vaporization of the water, while the other radiating member of the unit is utilized for the heating of the contents of the body of liquid within the bowl to a temperature suitable for use. In such a construction each of the radiating members performs a separate function upon the same part or material, namely, the water, and to produce a single result, namely, the production of a proper beverage. The type of heater which may be advantageously employed is equipped with a valve plate shown at 20 interposed between the resistance and the lower radiating member 13, carried by supports 21 resting on the bottom of the lower radiating member 13. This is for the purpose of concentrating the greater part of the heat generated at the vaporizing chamber to produce an effective pumping action in order that the strength of the beverage can be attained in the shortest possible time. The heat which is allowed to pass to the lower radiating member and from thence through the upstanding flange to the walls of the chamber and so to the walls of the bowl being sufficient to raise the temperature of the body of the liquid to a point proper for use in about the time required for the completion of the percolating action.

In Fig. 2 certain features of the above described invention are illustrated as applied to a chafing dish, water heater and the like, where $a'$ denotes the utensil, $b^2$ the base, $b^3$ the flange of the base upon which the receptacle rests and to which it is secured, 100 the heating unit, which is located within the holder 141, screws 142 passing through the bottom of the utensil through the base of the holder and through the heating unit, and being engaged by the nuts 143. 190 denotes the terminals from the resistance, and $b^{20}$ denotes a cap constituting an air tight closure for the aperture in the bottom of the base through which the unit can be passed for assembly, replacement, etc.

In using the word utensil, I desire it to be understood that I refer to any device which needs to be, or can advantageously be used in a heated condition and without regard to the use to which it is put.

I claim as my invention:

1. A utensil provided with parts to be separately heated, heat insulators between said parts, an electrical heater and separate heat conducting connections between said parts and the heater.

2. A utensil provided with parts adapted to be separately heated, an electrical heater therefor comprising a flat heating unit, heat conducting connections between one side of said heater and one of said parts, and additional heat conducting connections between the other side of said heater and the other part of the utensil.

3. The combination with the bowl and vaporizing chamber of a percolator and an electrical heater, of a heat conducting connection between one side of said heater and said vaporizing chamber, and an additional heat conducting connection between the other side of said heater and said bowl.

4. The combination with a percolator, of an electrical heater therefor including two radiating members with an interposed resistance, and a vaporizing chamber formed as a part of one of the radiating members, the other radiating member being arranged in heat conducting relation to the bowl of the percolator.

5. The combination with a percolator of an electrical heater therefor, comprising two radiating members spaced from one another at all points, and an interposed resistance, a vaporizing chamber formed as a part of one of the radiating members of said heater and projecting into said bowl, the other radiating member being arranged in heat conducting relation to the bowl of the percolator.

6. The combination with a percolator of an electrical heater therefor, comprising two radiating members spaced from one another at all points, and an interposed resistance, a vaporizing chamber formed as a part of one of the radiating members of said heater and projecting into said bowl but heat-insulated from the walls thereof, the other radiating member being arranged in heat conducting relation to the bowl of the percolator.

7. The combination with a percolator, of an electrical heater therefor, comprising a pair of spaced radiating members and an interposed resistance, a vaporizing chamber formed as a part of one of the radiating members and projecting into said bowl, heat insulators interposed between said radiating member and the walls of the bowl, the other radiating member being arranged in heat conducting relation with the bowl of the percolator.

8. The combination with a percolator provided with a vaporizing chamber, of an electrical heater therefor, comprising a heating unit, a radiating member in heat conducting relation with the vaporizing chamber and heat-insulated from the bowl, and a second radiating member in heat conducting relation with the bowl but heat-insulated from the vaporizing chamber.

9. The combination with a percolator having a vaporizing chamber mounted in a wall thereof but heat-insulated therefrom, of an electrical heater having one part arranged in heat conducting relation with said vaporizing chamber and another part in heat conducting relation with the bowl of said percolator.

10. The combination with a percolator of an electrical heater therefor comprising a pair of radiating members and an interposed resistance, a vaporizing chamber formed as a part of one radiating member of said heater, means for removably securing said vaporizing chamber to said bowl, and heat conducting connections between the other radiating member and the bowl of said percolator.

11. In a percolator the combination with the bowl, of an electrical heater therefor comprising an upper radiating member heat insulated from the bowl, a vaporizing chamber in heat conducting relation with said radiating member, a lower radiating member in heat conducting relation with the bowl, and a resistance material interposed between said radiating members.

12. In an electrically heated percolator, the combination with a bowl provided with a chamber at its lower end, of an electrical heater comprising a lower radiating member having an upstanding flange to fit within said chamber and contact with the side walls thereof, an upper radiating member spaced from said lower radiating member, a resistance interposed between said radiating members and insulated therefrom, and a recessed hub formed as a part of said upper radiating member and projecting through the aperture in the bowl for the purpose specified, and a heat insulator interposed between the said upper radiating member and the wall of the bowl.

13. In an electrically heated percolator, a chamber formed at the bottom of the bowl and having a central aperture, a heater located in said chamber and including upper and lower radiating members, the lower radiating member thereof being in heat conducting relation with the side walls thereof, a heat insulator interposed between the top member of said heater and the wall of the bowl, a central hub on said top member having a threaded end adapted to project through the aperture and be engaged by securing means located within the bowl, and a fluid-receiving cavity in said hub in communication with the interior of the bowl.

14. In an electrically heated percolator, a chamber formed at the bottom of the bowl and having a central aperture, a heater located in said chamber and including upper and lower radiating members, one radiating member of which is in heat conducting relation with the side walls thereof, a heat insulator interposed between the other radiating member of said heater and the wall of the bowl, a central hub on said last mentioned radiating member exteriorly threaded and adapted to project through the aperture and be engaged by securing means located within the bowl, a fluid-receiving cavity in said hub in communication with the interior of the bowl, and a heat insulator surrounding the exposed parts of said heating element.

15. In an electrically heated percolator, a chamber formed at the bottom of the bowl having a central aperture, an electrical heater located in said chamber and including upper and lower radiating members, the lower radiating member of which is in heat conducting relation with the side walls thereof, a heat insulator interposed between the top member of said heater and the wall of the bowl, a central hub on said top member having a threaded end adapted to project through the aperture and be engaged by securing means located within the bowl, a fluid-receiving cavity in said hub in communication with the interior of the bowl, and a base secured to the bottom of the bowl and forming therewith a closed chamber surrounding the exposed portions of said heating element.

16. In an electrically heated percolator, the combination with a bowl having its bottom recessed and centrally apertured and a base secured to the bottom of said bowl and forming with it an inclosed dead-air space, of a heating element comprising upper and lower radiating members, an upstanding flange on the lower radiating member, a resistance element interposed between and insulated from said radiating members, a recessed hub formed as a part of said upper radiating member and projecting through the aperture, and a receptacle located in said base and to which the terminal wires from said resistance element are connected.

17. In an electrically heated percolator a bowl having an aperture in its bottom, an inverted cup-shaped holder having an aperture, an electrical heater comprising a pair of radiating members and an interposed resistance, one of said radiating members having formed therewith a vaporizing chamber adapted to project through the apertures in the holder and bowl, means within the bowl engaging the walls of said vaporizing chamber to unite said heating unit and holder with said bowl, the other radiating member of said heater being arranged in heat conducting relation with the wall of said holder, and a heat insulator interposed between the first mentioned radiating plate and said holder and bowl.

18. In an electrically heated percolator, the combination with a bowl of an electrical heater comprising a pair of oppositely arranged radiating members, and an interposed resistance, a recessed hub forming a vaporizing chamber formed integrally with one of the radiating members and projecting through an aperture in the bowl, means within the bowl engaging said hub to secure said heater in position, means for insulating said member from the bowl, means for transmitting the heat in the other radiating member to the walls of said bowl, and a heat insulator surrounding exposed portions of the last mentioned radiating member.

JOSEPH F. LAMB.

Witnesses:
LEROY H. PAGE,
H. A. TRAVER.